Figure 1:
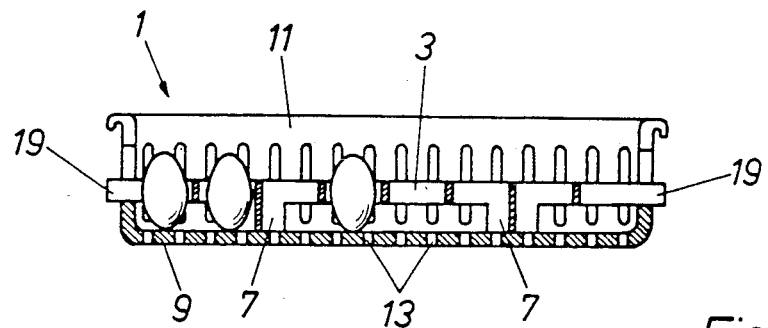

United States Patent [19]

Jensen

[11] Patent Number: 5,046,454
[45] Date of Patent: Sep. 10, 1991

[54] TRAY SYSTEM FOR INCUBATION AND HATCHING OPERATIONS, METHOD DURING USE OF THE TRAY SYSTEM AND USE OF THE TRAY SYSTEM

[75] Inventor: Jorgen B. Jensen, Sunds, Denmark
[73] Assignee: Funki A/S, Herning, Denmark
[21] Appl. No.: 450,595
[22] Filed: Dec. 13, 1989
[30] Foreign Application Priority Data
Dec. 20, 1988 [DK] Denmark ............................ 7108/88
[51] Int. Cl.⁵ .............................................. A01K 41/00
[52] U.S. Cl. ........................................ 119/43; 119/174
[58] Field of Search ................................. 119/43, 44, 1
[56] References Cited
U.S. PATENT DOCUMENTS

| 389,625 | 9/1888 | Windiate | 119/43 |
| 1,203,938 | 11/1916 | Terrio | 119/43 |
| 1,369,323 | 2/1921 | Clairemont | 119/44 |
| 1,501,292 | 7/1924 | Smith | 119/44 |
| 1,672,774 | 6/1928 | Patterson et al. | 119/44 |
| 2,255,036 | 9/1941 | Gedge | 119/43 |
| 2,846,976 | 8/1958 | Moller | 119/44 |
| 3,003,463 | 10/1961 | De Riscke | 119/43 |
| 3,309,013 | 5/1974 | Rigney et al. | 119/1 |
| 4,250,834 | 2/1981 | Cheselka | 119/1 |
| 4,615,300 | 10/1986 | McDonough | 119/1 |
| 4,771,731 | 9/1988 | Derx et al. | 119/1 |

FOREIGN PATENT DOCUMENTS 121349  4/1948  Sweden ................................. 119/43

Primary Examiner—Paul J. Hirsch
Attorney, Agent, or Firm—Lee, Mann, Smith, McWilliams & Sweeney

[57] ABSTRACT

A tray (1) with an insert (3) for the support of eggs in an incubation and hatching process has the insert (3) placed loosely near the bottom (9) of the tray (1). The eggs are placed in the tray (1) with the insert (3) and incubated, after which the insert (3) is raised into an upper position or removed from the tray (1). The eggs will hereby roll onto their sides into the position most suitable for hatching. With the invention, the use is avoided of fixed partition walls which occupy space in the bottom (9) during hatching, while at the same time undesired shock effects on the eggs and their transfer to special hatching trays is avoided. According to the invention, only one type of tray is necessary for the transport, incubation and hatching of eggs and the transport of newly-hatched poultry.

7 Claims, 2 Drawing Sheets

TRAY SYSTEM FOR INCUBATION AND HATCHING OPERATIONS, METHOD DURING USE OF THE TRAY SYSTEM AND USE OF THE TRAY SYSTEM

In the hatching of eggs for the mass production of chickens and other poultry, the process is rationalized in hatcheries which handle eggs from several egg producers. At the producers, the eggs are collected and placed in trays which are stacked in such a manner that they can be transported on pallets or bag trucks. The trays, which can possibly be hooked together in threes, are then placed on shelves in incubation carriages, which are portable racks with tiltable shelves. After a disinfection with gas, the eggs are introduced in suitable lots into an incubator, which is a chamber in which under air circulation there are maintained temperatures and humidity suitable for the hatching process, which for hens' eggs extends over approximately 18 days. During the process, the shelves with the trays are tilted slowly from side to side, and the eggs, which are placed in the trays with the "pointed" end downwards, are therefore fixed in openings or with guide pins in the trays.

After a period of time in the incubator, typically after 8 days, the eggs are examined to determine whether or not they are fertilized. This is effected by placing each tray over a light source. The unfertilized eggs will show themselves by being translucent, and are removed manually or mechanically. The incubation is then continued.

On the 18th day, the eggs are taken out of the incubator, possibly placed in special hatching trays with high side-edges, and placed in the hatching cabinet, which is chamber with slightly different conditions of temperature and humidity. Here, the trays are constantly held in the horizontal position, and the eggs are held lying on their sides as if on a flat underlayer for the three days it takes for the hatching to occur.

The trays with the hatched chickens are then taken out, and the chickens are counted during transfer to special transport trays. These transport trays, which can be stacked, have high sides and perforated bottoms, and with the known technique they are used only for the transport from the hatchery to the place of rearing, and are therefore returned empty to the hatchery.

The invention relates to a tray system for use in incubation and hatching operations, during transport, the incubation and the hatching of the eggs, and comprises a tray provided with perforated bottom, in relation to which the sides along the edges extend uniformly upwards, and in which tray there is placed an insert which is parallel with the bottom and which is of substantially the same extension as the bottom. This insert has openings transversely to its extension, said openings being arranged to support eggs standing up on their pointed ends. The invention also relates to a method during use of the tray system, comprising the process stages of incubation and hatching, in that during incubation the eggs in the same trays are held upright and during hatching are held lying on their sides and where before incubation the eggs are placed in trays, each having an insert for the supporting of the eggs.

Such a system consisting of a tray with insert and such a method during the use of the tray system is known from U.S. Pat. No. 4,398,499. The known tray is arranged to be used in a work cycle which does not demand removal or handling of the eggs between the incubation and the hatching In principle, the tray is arranged as a hatching tray, in which the eggs can lie on their sides in separate compartments. In their functional position, the trays are stacked, and between each stacked tray above and below there is provided a cover with openings slightly larger than the maximum diameter (at right angles to the egg's horizontal axis) of the relevant eggs. The flat extension of the cover is disposed at a distance from the overlying bottom, which has downwardly extending pins. The tray system functions by the trays being placed with the bottom upwards, and the eggs being placed in the cover openings with their pointed ends resting on the pins. The stacks of trays are run through the incubation process, where the stacks are rocked as described above Before the hatching process, the stacks are turned slowly 180° so that the eggs fall or glide from their standing position in the covers to their horizontal position in the separate compartments in the bottoms of the trays After hatching, the chickens can be removed by emptying the trays, starting from the tops of the stacks The trays can then be returned to the egg producer to be filled with eggs. Although the eggs are not damaged externally by being turned in the trays, they are nevertheless exposed to a greater shock effect than with other known methods, where the eggs are supported during the turning or change of position. For the reason that with the special turning according to this U.S. publication it is necessary to prevent the eggs from sliding along the bottom at 90° turning of the trays, it is necessary to arrange special compartments with partition walls for the hatching position. These partition walls take up extra space.

Other attempts to reduce the handling of the eggs between the incubation and the hatching are known, e.g. from U.S. Pat. No. 2,266,648, where a tray is arranged as two mutually long bottoms and two displaceable side parts, so that the bottom area can be changed. Before the hatching, the eggs are placed vertically on the tray's flat bottom while this is in its telescoped position, in that the eggs are supported by each other and by the sides of the tray. Before the hatching, the tray is enlarged by being drawn out, upon which the eggs lie on their sides by virtue of the larger space provided hereby. The disadvantage with this technique is that each tray must be completely filled in order for the eggs to stand securely, and that in filling the trays the eggs must first be placed in the trays and then each egg must be turned up on end when the tray is nearly full. This is a time-consuming process. Moreover, the bottom of the tray is at least partly double during the incubation process, which even with perforated bottoms will result in a diminished possibility for passage of the ventilation air.

The object of the invention is to provide a tray system which, during the hatching process, can contain a greater number of eggs in relation to the area than hitherto known tray systems, and that in the use of the tray in the method of the mentioned kind it is not necessary to use more time in positioning the eggs before incubation or before hatching, and where the shock effect on the eggs is avoided just prior to the hatching process.

This is achieved according to the invention with a tray system of the above-mentioned kind, and which is characteristic in that the side of the bottom facing towards the upright sides along the edges is substantially level and without pins or partition walls, and where the insert is loosely supported by the bottom or by the sides at a distance from the free upwardly-turning edges of the sides.

The method according to the invention is characteristic in that before incubation and after hatching the inserts are displaced upwards, whereby openings in the inserts pass the eggs which remain on the bottoms of the trays.

Since there are no partition walls in the bottom for the hatching position, as is the case in the first-mentioned U.S. Patent publication, there is room for a larger number of eggs in the tray. When the inserts, which during the incubation support the eggs in their upright position, are lifted or displaced upwards to a position above the eggs, or possibly removed completely, the eggs roll over on to their sides in the hatching position. There is hereby achieved a more gentle handling of the eggs than by the invention's prior conditions, besides which the rational operation by using the same trays during the incubation and hatching process is maintained.

The tray can be configured with slots in the sides so that the displacement of the inserts can be carried out with means outside the tray, e.g. remotely-controlled pins on a carriage for the tray, which can enter into engagement with the insert. It is thus avoided that the insert has to be removed completely from each single tray between the incubation and the hatching process Furthermore, it is advantageous to configure the tray, whereby ledges or the like in the slots can receive the insert or pins on the insert, thus enabling the insert to rest in a raised position during the hatching process The raised position of the insert is thus independent of means outside the tray.

By the method, whereby the inserts are raised by means placed at or through the sides of the tray, it is avoided that the trays are separated by the lifting of the inserts, in that this movement can be effected from outside the tray, possibly with automatic control elements.

A use according to the invention, where a tray system intended for transport and hatching of eggs is used for the dispatching of newly-hatched poultry, has the advantage that only one type of tray is necessary for all of the handling in the hatchery, right from when the eggs are put in by at the producers to when the poultry are delivered to the place of rearing.

Figure 2:
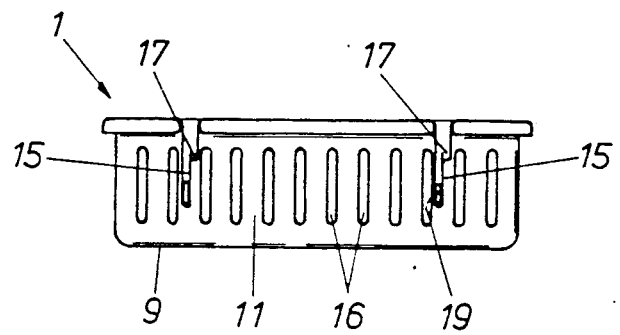
Figure 3:
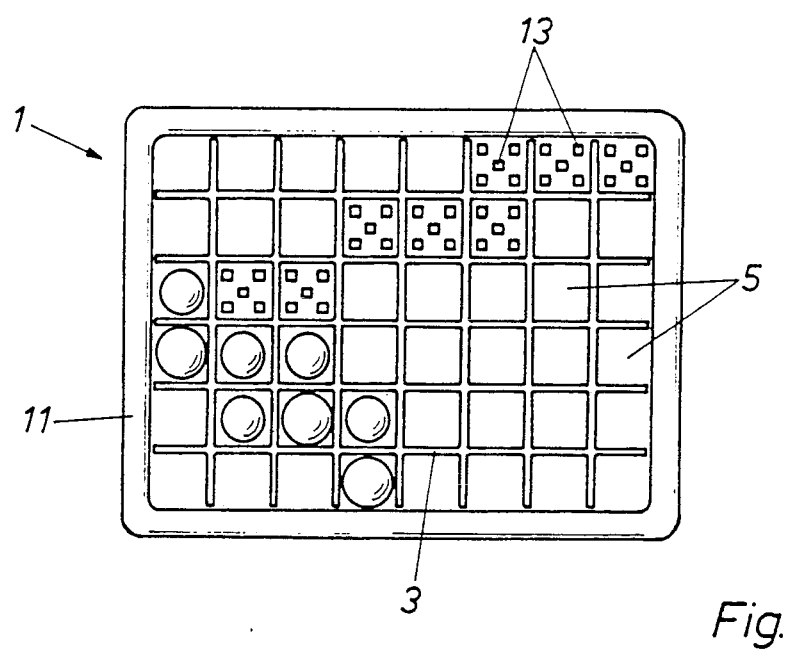
Figure 4:
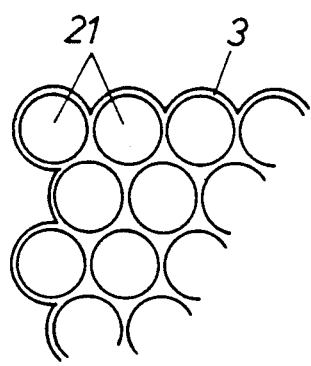
Figure 5:
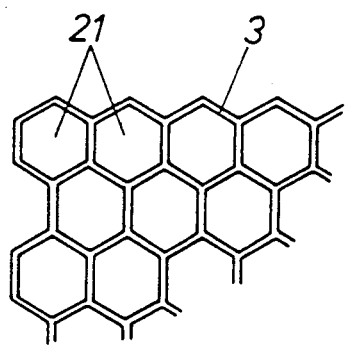
Figure 6:
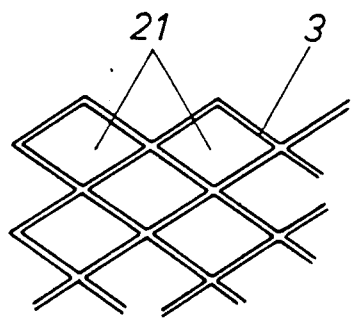

Embodiments of the invention will now be described in more detail with reference to the drawing, where FIG. 1 shows a tray with insert according to the invention in a first embodiment seen in section, FIG. 2 shows the same as in FIG. 1, but at right angles hereto and not in section, FIG. 3 shows a second embodiment of the tray according to the invention seen from above, and FIG. 4-6 show different other embodiments of the insert for the tray.

In a first embodiment of the invention, the tray 1 is injection moulded in plastic material and provided with perforations 13 in the bottom and openings 16 in the sides 11 to allow the passage of air. A grid-shaped insert 3 with square openings 5 stands on feet 7 on the bottom 9 of the tray. The dimension of the openings allows the passage of the largest possible eggs derived from the relevant kind of poultry.

In the embodiment shown, the tray has sides 11 upwards to open slots 15 with ledges 17. Projections 19 extending from the insert 3 rest in or merely project through the slots 15. The insert 3 can be lifted by the projections 19 and possibly placed near to the upper edge of the tray, in that the projections 19 rest on the ledges 17.

In other embodiments, the slots 15 could be closed at the top so that the insert 3 is not able to fall out of the tray. Moreover, as shown in FIG. 3, the tray could be without slots and the insert without the projections, in that the insert 3 is removed completely when the eggs are to assume the hatching position.

Furthermore, the tray according to the invention can be provided with not-shown projections or flanges along the upper edge, or with pins and holes corresponding to the pins in the bottom, thus enabling the trays to be arranged in stacks which can easily be handled during the whole sequence of operations from when the eggs are introduced at the producer to the delivery of chickens to the place of rearing Moreover, the trays can be provided with not-shown hook elements at the sides, hereby enabling several trays 1 to be hooked together out of regard for placing in the incubators etc.

As shown in FIGS. 4-6, the insert 3 can be configured with openings 21 of different shapes, e.g. circular, honeycomb-shaped or parallelogram-shaped.

The holes 13 in the bottom 9 of the tray are dimensioned so that the chickens cannot get their knee joints locked in them, but are still large enough to allow most of the smaller pieces of eggshell to pass through during mechanical cleaning of the trays.

With the method according to the invention, the eggs are placed in the trays 1 with inserts 3 at the producers, the trays are stacked and driven to the hatchery. Here, they are put through the process as described in the introduction and in the principle with the trays in stacks, in that the eggs are disinfected and placed in the incubator. Here, the trays can be placed on tiltable shelves in the incubator carriage in the same manner as with hitherto-known techniques, or, in a further development, whole stacks of trays are placed in special tilting racks which, during the period of incubation, tilt the stacks in the same way as hitherto known. If, during the incubation, it is desired to avoid movement of the eggs in relation to the inserts 3, it is possible for the inserts 3 to be produced with not-shown yielding projections which extend from the wall of the insert into the openings 5 in such a manner that the eggs are supported laterally but still remain in the tray 1 when the insert 3 is lifted. For the transillumination, the trays 1 are taken down on the light cabinet as per hitherto-known incubation trays, and in order to increase the translucence through the bottom 9, the tray can be made of a relatively translucent material.

After incubation, one can proceed with the hatching process in two ways. With the first, there is used a tray with insert as shown in FIG. 3, and the inserts are removed from each tray, whereupon the eggs roll on to their sides. With the second way, a tray as shown in FIGS. 1-2 is used, where the projections 19 are operated by being lifted upwards with automatically-controlled elements arranged in the carriages the trays are standing in, or possibly by means of elements in the hatching cabinet, which possibly can be a further development of the hitherto-known incubator. Thus with the projections 19 resting on the ledges 17, the hatching can proceed in the normal manner with the eggs in the lying position. Hereafter, the chickens can be removed manually from the trays, which are then cleaned of shell, dust etc., and the chickens are counted and transferred to the cleaned trays of the same kind as the incubation/hatching trays. The trays with the chickens are then stacked again on pallets or in wheeled crates for dispatch by truck to the place of rearing. The invention provides the possibility of the chickens being able to be dispatched immediately after being hatched in the trays in which the hatching has taken place, i.e. without cleaning of the trays, possibly merely after the removal of unhatched eggs and larger pieces of eggshell.

The tray system and the method according to the invention can naturally be varied in detail in other ways than those described above.

I claim:

1. Tray systems for use in the transport, incubation and hatching of eggs during hatching operations, the tray system having a tray including a perforated bottom, sides extending uniformly upwardly from edges of the bottom, and an insert in the tray disposed essentially parallel to the bottom, said insert having an extent generally the same as said bottom and having openings arranged to support eggs standing on their tapered ends, the improvement comprising the bottom being substantially even with no protruding pins or partition walls, and the insert including means freely supported said insert within said tray at a position above said bottom, with said insert being spaced from said sides.

2. The system according to claim 1, in which said sides include vertical slots therein providing access to said insert such that said insert may be moved relative to the bottom by means exterior to said tray.

3. The system according to claim 2, in which said insert includes projections extending through said slots, and said slots include means for engaging said projections for supporting said insert in a second position above said bottom.

4. The system according to claim 3, in which said means for engaging comprises a ledge formed in each slot.

5. The system according to claim 1, in which said means freely supporting comprises a plurality of feet beneath said insert and resting on said bottom.

6. A method for the transport, incubation and hatching of eggs, in which, in the same tray eggs are permitted to stand upright on the bottom of the tray during incubation and lie on their sides during hatching, the eggs being supported unright by an insert in the tray, the improvement comprising providing the insert with openings sufficiently large for eggs to pass through, installing the insert in the tray at a first position above said bottom during incubation such that the insert maintains said eggs upright in said openings, and during hatching raising said insert upwardly to a second position above said bottom such that said eggs pass through said openings and said eggs lie on their sides on said bottom.

7. The method according to claim 6 in which said tray includes access slots in sides thereof and said insert includes projections in said slots, and in which the step of raising said inserts includes engaging of said projections and lifting said insert thereby.

* * * * *